United States Patent
Huang

(10) Patent No.: US 12,443,242 B2
(45) Date of Patent: Oct. 14, 2025

(54) ASSEMBLY OF ELECTRONIC DEVICE AND STAND

(71) Applicant: Chung-Yi Huang, Taichung (TW)

(72) Inventor: Chung-Yi Huang, Taichung (TW)

( * ) Notice: Subject to any disclaimer, the term of this patent is extended or adjusted under 35 U.S.C. 154(b) by 147 days.

(21) Appl. No.: 18/535,507

(22) Filed: Dec. 11, 2023

(65) Prior Publication Data

US 2024/0192733 A1    Jun. 13, 2024

(30) Foreign Application Priority Data

Dec. 12, 2022   (TW) .................................. 111213707

(51) Int. Cl.
*G06F 1/16* (2006.01)

(52) U.S. Cl.
CPC .................................... *G06F 1/166* (2013.01)

(58) Field of Classification Search
CPC ........................................................ G06F 1/166
See application file for complete search history.

(56) References Cited

U.S. PATENT DOCUMENTS 8,964,376 B2 * 2/2015 Chen ....................... G06F 1/166
                                                    361/679.55
9,483,083 B1 * 11/2016 Zaloom .................. F16M 11/10

* cited by examiner

*Primary Examiner* — James Wu
(74) *Attorney, Agent, or Firm* — Che-Yang Chen; Law Office Of Michael Chen

(57) ABSTRACT

An assembly of an electronic device and a stand includes an electronic device, a stand and two springs. The electronic device includes two first clutches located on both sides of the electronic device. The stand includes two pivot ends which are symmetrically pivoted to the both sides of the electronic device. Each pivot end includes a second clutch formed to an inside thereof and engaged with the first clutch of the electronic device to form a locking position and an unlocking position. The springs are respectively located between the electronic device and the stand. When no external force applied, each pivot end engaged with the first clutch corresponding thereto to form a locking position. When each pivot end is pulled in a direction away from the first clutch, the second clutch is disengaged from the first clutch to form an unlocking position, and the stand is pivotable relative to the electronic device.

6 Claims, 6 Drawing Sheets

ASSEMBLY OF ELECTRONIC DEVICE AND STAND

FIELD OF THE INVENTION

The present invention relates to an assembly of an electronic device and a stand, and more particularly, to an adjustable stand that is angle-adjustable relative to the electronic device supported by the stand.

BACKGROUND OF THE INVENTION

In many electronic devices, due to the presence of numerous circuits and components, diagnostic devices are typically configured to promptly obtain device information for monitoring or maintenance. For instance, a diagnostic computer used to diagnose automotive conditions is connected to the corresponding port of the vehicle via a signal cable. This allows retrieval of various parameters such as vehicle performance and fault codes, providing information on the detected issues for maintenance.

However, conventional diagnostic computers lack a stand for properly supporting and positioning the diagnostic computers, making it challenging to control the angle of the diagnostic computer screen. When connected to a vehicle, users usually have to hold the device by hand, and during vehicle maintenance, technicians often place the diagnostic computer on the ground or on the engine compartment, resulting in inconvenience.

In order to deal with these issues, the inventor provides a stand that is able to support and position the diagnostic computer, and the stand is adjustable relative to the diagnostic computer. The present invention overcomes the mentioned drawbacks, leading to the completion of this invention.

To overcome the aforementioned drawbacks, the present invention provides an assembly of an electronic device and an adjustable stand. The adjustment of rotation and fixation of the stand is achieved through the engagement and disengagement of the first and second clutches.

SUMMARY OF THE INVENTION

The present invention relates to an assembly of an electronic device and a stand, and comprises an electronic device having a pair of first clutches located on both sides of the electronic device. A stand has a pair of pivot ends which are symmetrically pivoted on the both sides of the electronic device. Each pivot end includes a second clutch formed to an inside thereof and is engaged with or disengaged from the first clutch of the electronic device to form a locking position and an unlocking position. A pair of springs are respectively located between the electronic device and the stand. When no external force applied, each pivot end is pulled by the spring and toward the first clutch to engage the second clutch with the first clutch to form the locking position to restrict pivoting of the stand. When each pivot end is pulled in a direction away from the first clutch, the second clutch is disengaged from the first clutch to form the unlocking position, and the stand is able to be pivotable relative to the electronic device.

Preferably, the electronic device includes a pair of first pivot portions symmetrically located on the both sides of the electronic device. Each pivot end of the stand has a second pivot portion pivotally attached to the first pivot portion so that the stand is pivotable about the first pivot portions.

Preferably, the first clutches and the second clutches are annular and tooth-shaped, each encircling an outer periphery of the first pivot portion and the second pivot portion, respectively.

Preferably, the stand is a U-shape stand and includes bar and a pair of legs. The pivot end is formed to a first end of each leg, and the bar is connected between two respective second ends of the two legs.

Preferably, the electronic device has a pair of protrusions symmetrically located inside the electronic device. The pivot end of each leg includes a reception area formed to an outside thereof, a hole defined through the reception area, and an end piece. The end piece has a hook end and a seal end. The end piece extends through the hole and the seal end is engaged with the reception area. Two ends of the spring are connected between the hook end of the end piece and the protrusion of the electronic device.

Preferably, the electronic device includes pair of recesses which are concave on the both sides of the electronic device and located corresponding to the first clutches. The pivot ends of the stand are located in the recesses and pivotally connected to the electronic device.

Preferably, the recesses each have a first stop portion and a second stop portion to restrict pivotal movement of the stand.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
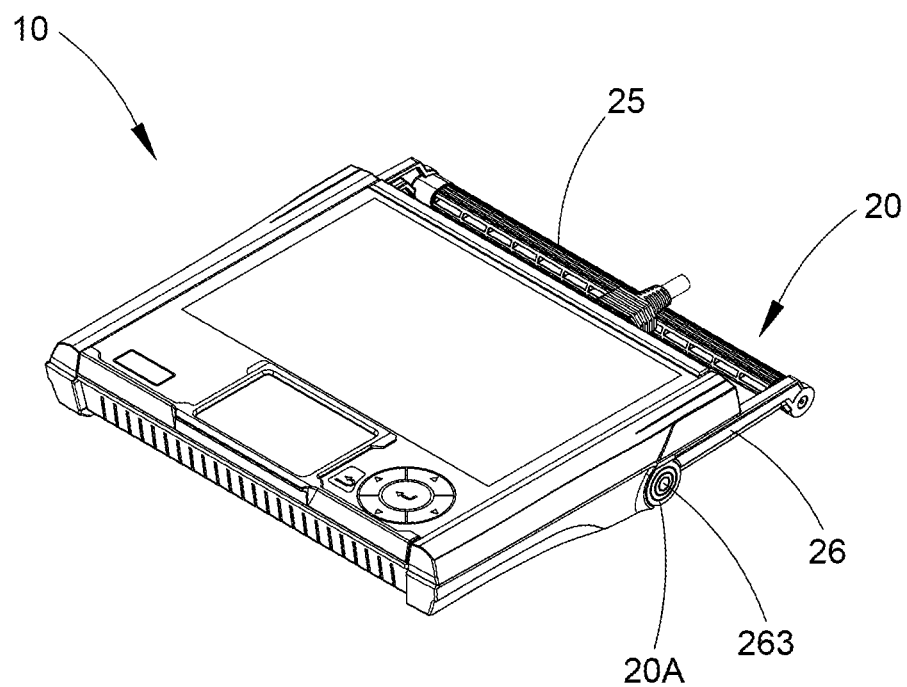
FIG. 1 is a perspective view to show the assembly of an electronic device and a stand of the present invention.
Figure 2:
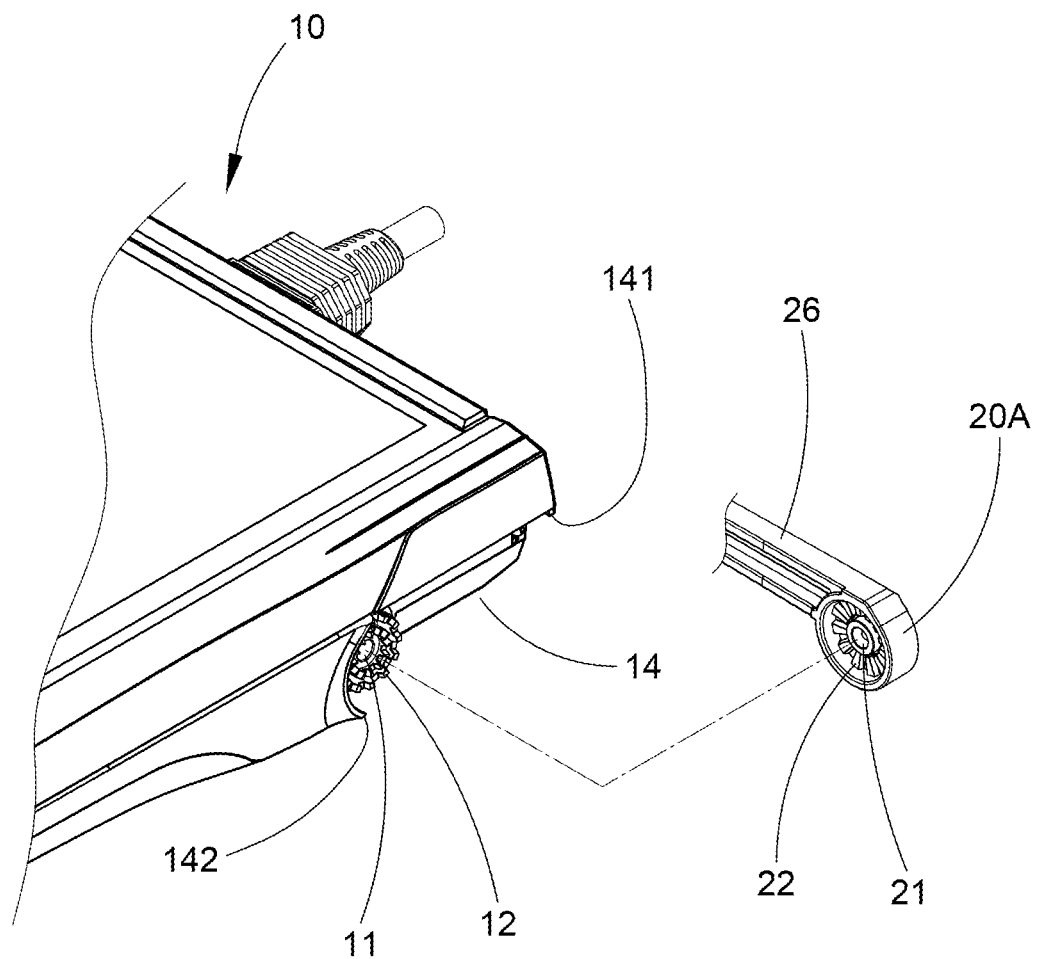
FIG. 2 is an exploded view of the assembly of an electronic device and a stand of the present invention.
Figure 3:
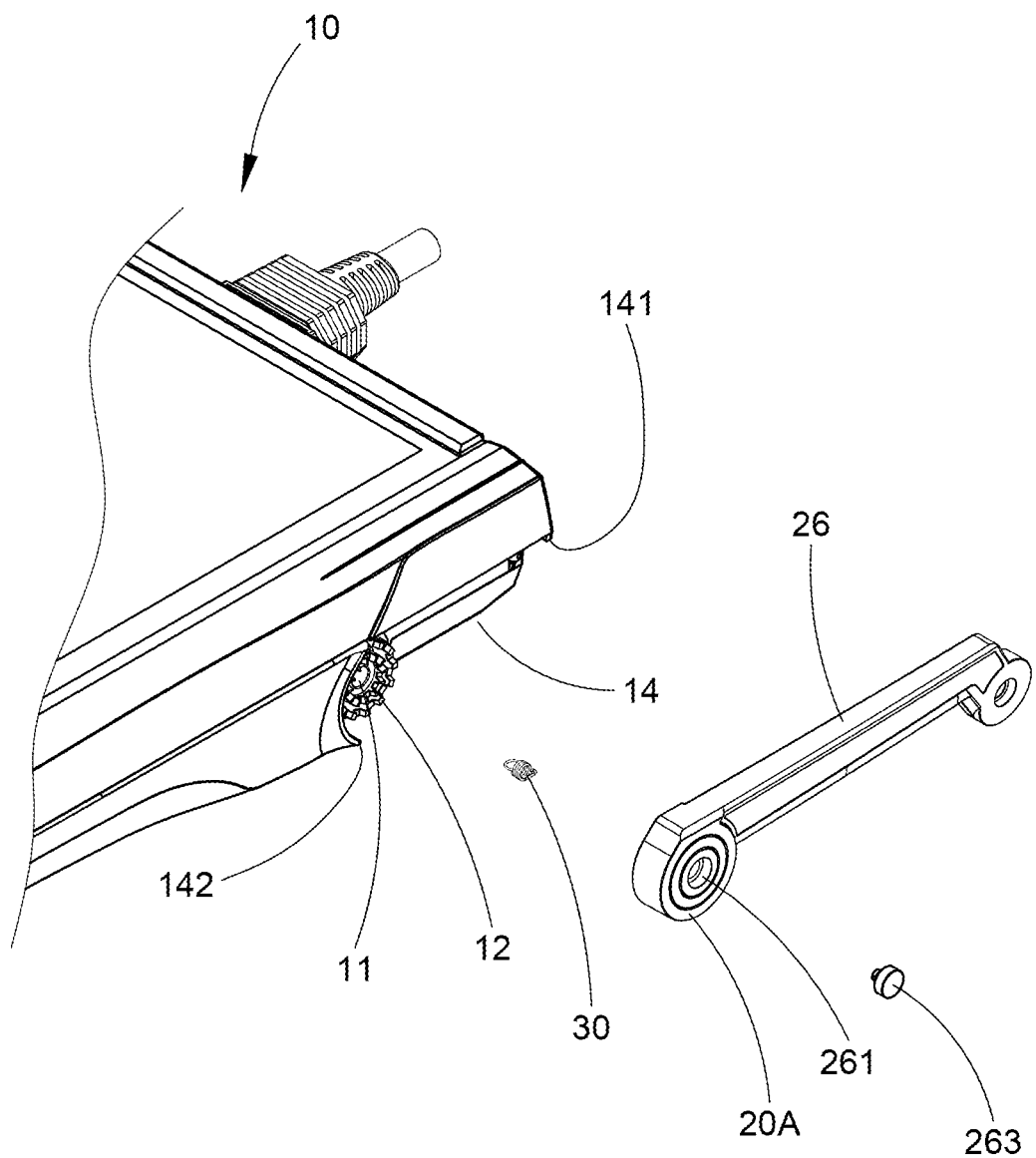
FIG. 3 is another exploded view of the assembly of an electronic device and a stand of the present invention.

Referring to FIGS. 1 to 3, the assembly of an electronic device and a stand of the present invention comprises an electronic device 10, a stand 20 and a pair of springs 30.

The electronic device 10 can be, but is not limited to, a diagnostic computer. The diagnostic computer is equipped with a screen, operating interface, and multiple ports of different specifications designed to connect to various instruments, facilitating diagnostic and control functions. The electronic device 10 includes a pair of first pivot portions 11 symmetrically located on both sides of the electronic device 10, a pair of first clutches 12 located on the both sides of the electronic device 10, and a pair of protrusions 13. The first pivot portions 11 are located close to a top edge of the electronic device 10. Each of the first clutches 12 is annular and tooth-shaped, and encircle an outer periphery of the first pivot portion 11. The protrusions 13 are symmetrically located inside the electronic device 10 and located corresponding to the first clutches 12. In this embodiment, the electronic device 10 includes pair of recesses 14 which are concave on the both sides of the electronic device 10 and located corresponding to the first clutches 12.

The stand 20 has a pair of pivot ends 20A which are symmetrically pivoted on the both sides of the electronic device 10. The stand 20 is a U-shape stand and includes a bar 25 and a pair of legs 26. The pivot end 20A is formed to a first end of each leg 26, and the bar 25 is a cylindrical bar and connected between two respective second ends of the two legs 26. The bar 25 is a grip bar for users to grip and carry the assembly to desired positions. Each pivot end 20A includes has a second pivot portion 21 and a second clutch 22, wherein the first pivot portion 21 is pivotally attached to the first pivot portion 11 so that the stand 20 is pivotable about the first pivot portions 11. The second clutch 22 is formed to an inside thereof and is engaged with or disengaged from the first clutch 12 of the electronic device 10 to form a locking position P1 and an unlocking position P2. The pivot ends 20A of the stand 20 are located in the recesses 14 and pivotally connected to the electronic device 10. The outer surface of the stand 20 is in flush with two both sides of the electronic device 10. The recesses 14 are located at two corners of the electronic device 10 and communicate with the top edge, bottom and the both sides of the electronic device 10. The recesses 14 each have a first stop portion 141 and a second stop portion 142 to restrict pivotal movement of the stand 20. In other words, the stand 20 can only be pivoted between the first and second stop portions 141, 142.

The pivot end 20A of each leg 26 includes a reception area 261 formed to an outside thereof, a hole 262 defined through the reception area 261, and an end piece 263. The reception area 261 is a circular shape recess. The end piece 263 has a hook end 2631 and a seal end 2632 from which the hook end 2631 extends. The end piece 263 extends through the hole 262 and the seal end 2632 is engaged with the reception area 261.

The two springs 30 can be, but are not limited to, a compression spring. The two springs 30 are respectively located between the electronic device 10 and the stand 20. Two ends of the spring 30 are connected between the hook end 2631 of the end piece 263 and the protrusion 13 of the electronic device 10.

When no external force applied, each pivot end 20A is pulled by the spring 30 and toward the first clutch 12 to engage the second clutch 22 with the first clutch 12 to form the locking position P1 to restrict pivoting of the stand 20. When each pivot end 20A is pulled in a direction away from the first clutch 12, the second clutch 22 is disengaged from the first clutch 12 to form the unlocking position P2, and the stand 20 is able to be pivotable relative to the electronic device 10.

Figure 4:
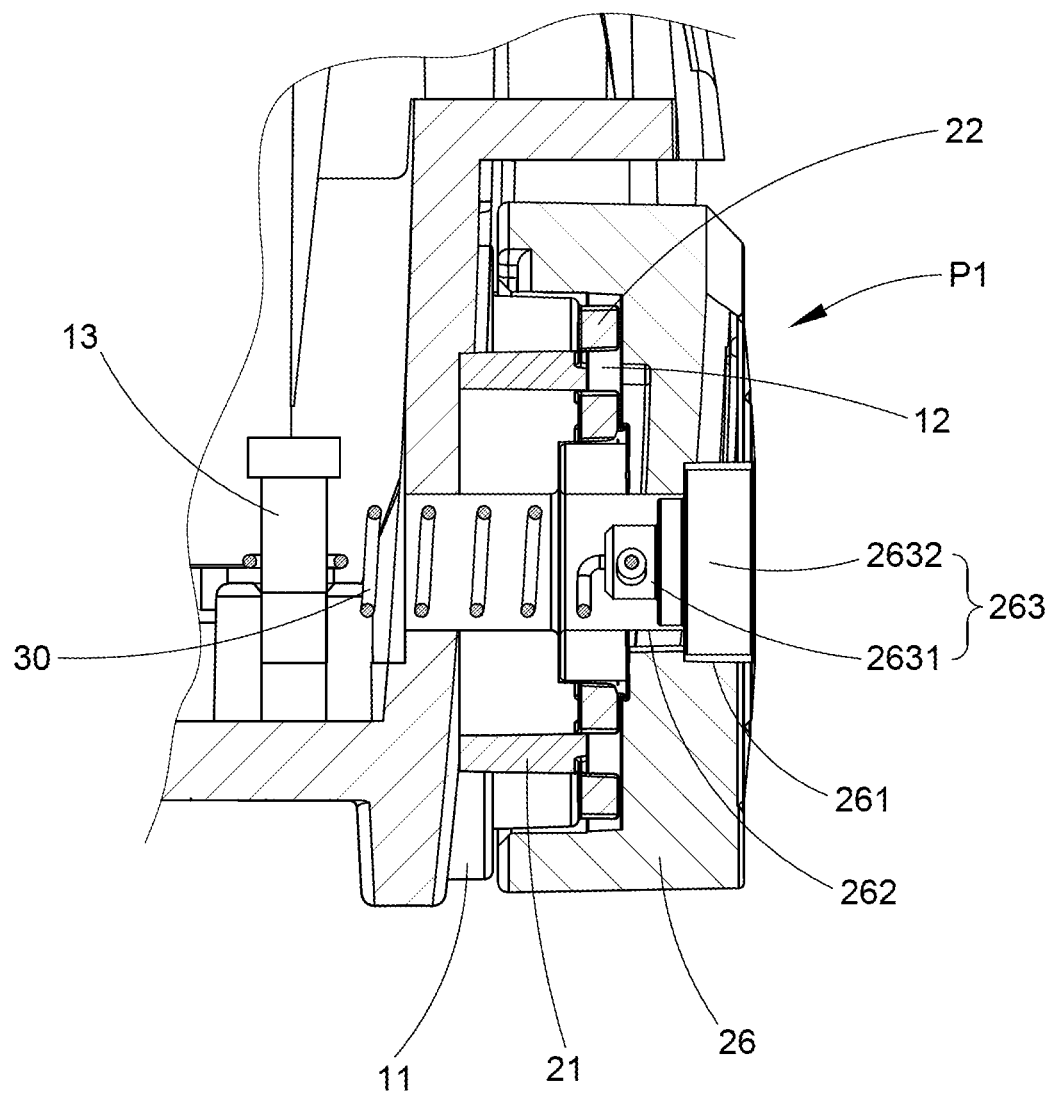
FIG. 4 shows the locking position between the first and second clutches.

As shown in FIG. 4, as the two ends of the spring 30 are connected between the hook end 2631 of the end piece 263 and the protrusion 13 of the electronic device 10. When no external force applied, each end piece 263 is pulled by the spring 30 and toward the electronic device 10, so that the pivot end 20A is moved toward the electronic device 10 to maintain the engagement between the first clutch 12 and the second clutch 22 to maintain the locking position P1 to restrict pivoting of the stand 20.

Figure 5:
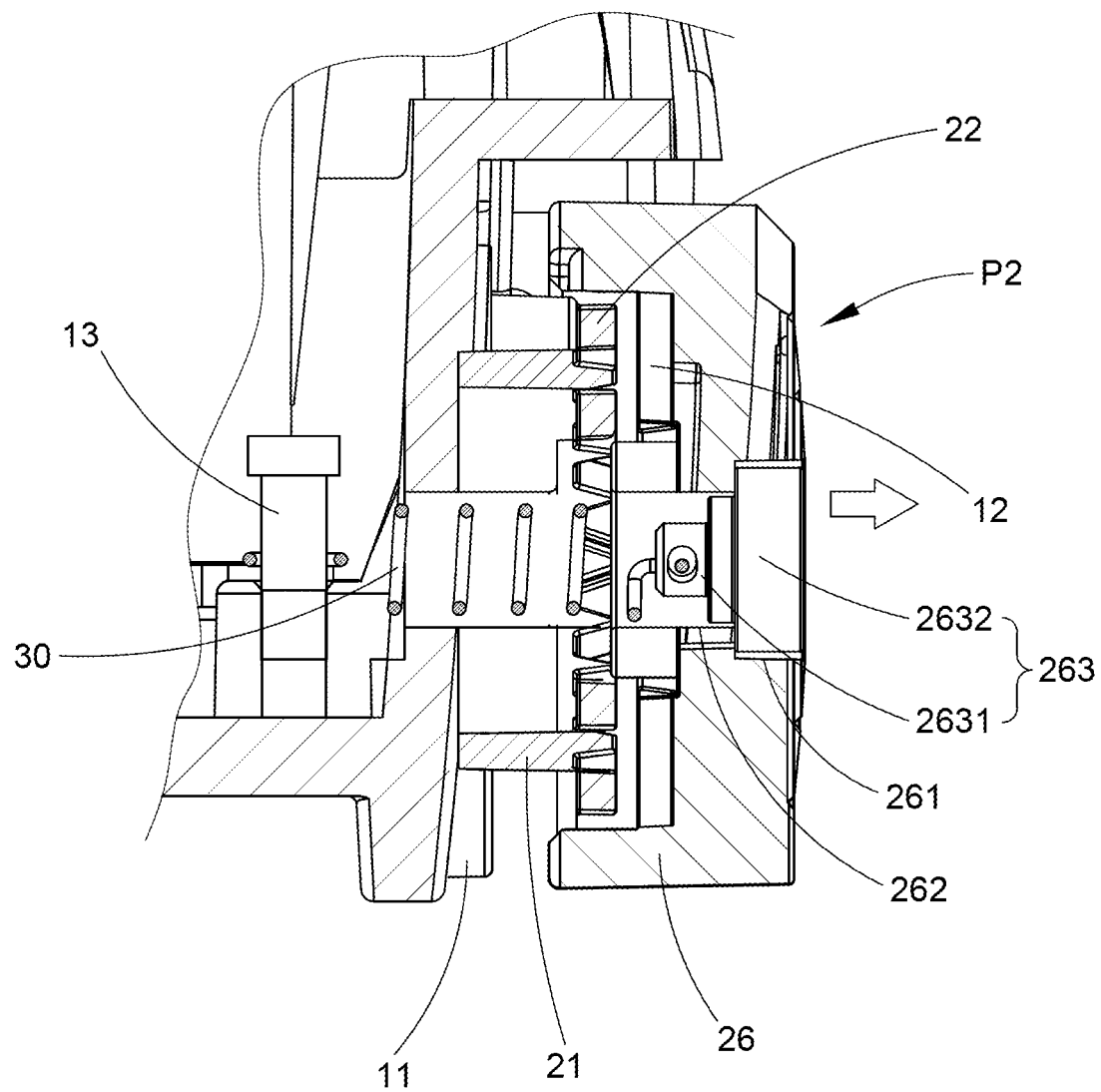
FIG. 5 shows the unlocking position between the first and second clutches.

As shown in FIG. 5, when an external force that is greater than the resilient force of the springs 30 and pulls each pivot end 20A in a direction (hollow arrow) away from the first clutch 12, the spring 30 is extended, the second clutch 22 is disengaged from the first clutch 12 to form the unlocking position P2, and the stand 20 is able to be pivotable relative to the electronic device 10. When the external force is disappear, the pivot end 20A is pulled by the spring 30, and the second clutch 22 is engaged with the first clutch 12, and the locking position P1 is formed again.

Figure 6:
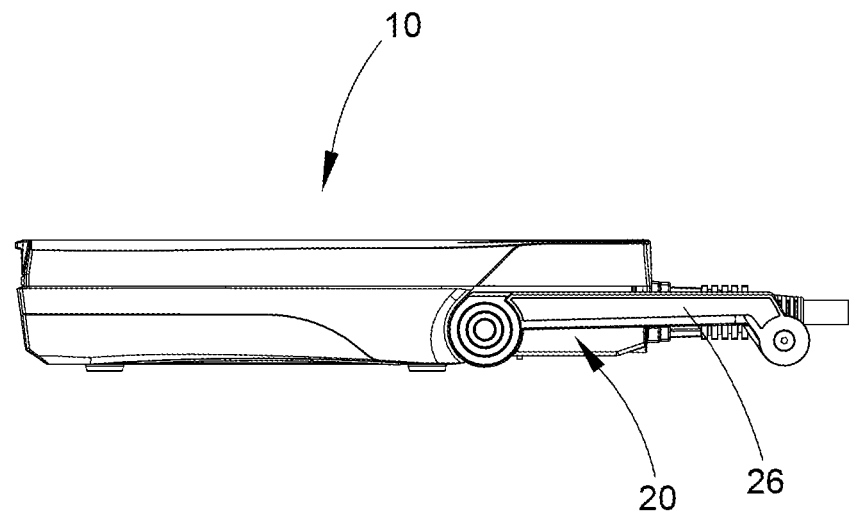
FIG. 6 shows one status of the stand and the electronic device.
Figure 7:
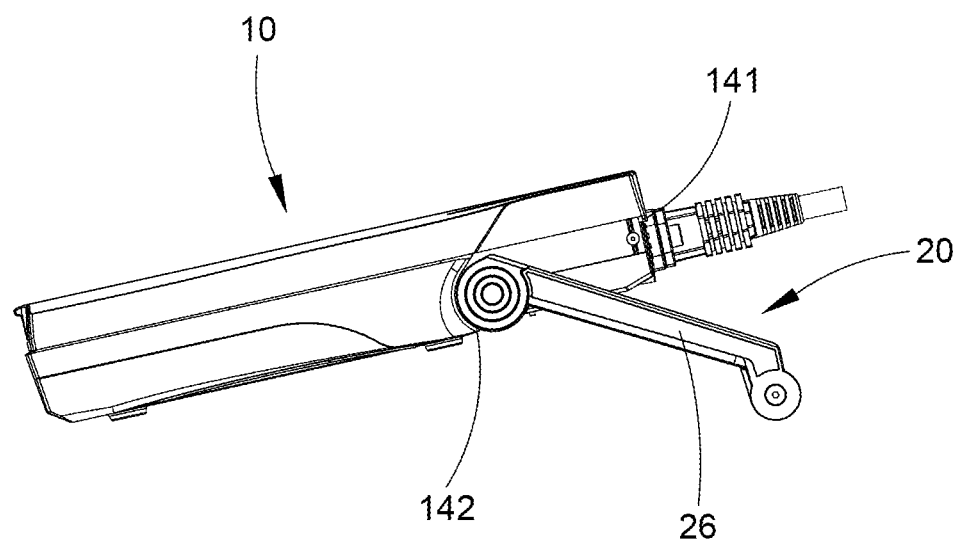
FIG. 7 shows another one status of the stand and the electronic device.

It is noted that, by adjusting the stand 20, the angle between the stand 20 and the electronic device 10 can be set to different angles (as shown in FIGS. 6 and 7). This allows users to adapt to different needs. For example, when the electronic device 10 is placed on a work surface (such as a desk), adjusting the angle between the electronic device 10 and the stand 20 to 90 degrees can provide mutual support on the work surface.

From the above explanation, it is evident that in operation, users only need to exert slight force with both hands to pull the legs 26 outward. This action moves the second clutch 22 to the unlocking position P2, allowing the stand 20 to be rotated to the desired angle. After completing the adjustment, releasing the force applied by both hands allows the pair of springs 30 to pull the legs 26 back, moving the second clutch 22 to the locking position P1 to set the adjusted angle of the stand 20.

While we have shown and described the embodiment in accordance with the present invention, it should be clear to those skilled in the art that further embodiments may be made without departing from the scope of the present invention.

What is claimed is:

1. An assembly of an electronic device and a stand, comprising:
   the electronic device having a pair of first clutches located on both sides of the electronic device, the electronic device having a pair of protrusions symmetrically located inside the electronic device;
   the stand having a pair of pivot ends which are symmetrically pivoted on the both sides of the electronic device, each pivot end including a second clutch formed to an inside thereof and engaged with or disengaged from the first clutch of the electronic device to form a locking position and an unlocking position;
   a pair of springs respectively located between the electronic device and the stand;
   the pivot end of each leg including a reception area formed to an outside thereof, a hole defined through the reception area, an end piece having a hook end and a seal end, the end piece extending through the hole, the seal end engaged with the reception area, two ends of the spring connected between the hook end of the end piece and the protrusion of the electronic device, and
   wherein when no external force applied, each pivot end being pulled by the spring and toward the first clutch to engage the second clutch with the first clutch to form the locking position to restrict pivoting of the stand, when each pivot end is pulled in a direction away from the first clutch, the second clutch is disengaged from the first clutch to form the unlocking position, and the stand is pivotable relative to the electronic device.

2. The assembly of the electronic device and the stand as claimed in claim 1, wherein the electronic device includes a pair of first pivot portions symmetrically located on the both sides of the electronic device, each pivot end of the stand has a second pivot portion pivotally attached to the first pivot portion so that the stand is pivotable about the first pivot portions.

3. The assembly of the electronic device and the stand as claimed in claim 2, wherein the first clutches and the second clutches are annular and tooth-shaped, each encircling an outer periphery of the first pivot portion and the second pivot portion, respectively.

4. The assembly of the electronic device and the stand as claimed in claim 1, wherein the stand is a U-shape stand and includes a bar and a pair of legs, the pivot end is formed to a first end of each leg, the bar is connected between two respective second ends of the two legs.

5. The assembly of the electronic device and the stand as claimed in claim 1, wherein the electronic device includes a pair of recesses which are concave on the both sides of the electronic device and located corresponding to the first clutches, the pivot ends of the stand are located in the recesses and pivotally connected to the electronic device.

6. The assembly of the electronic device and the stand as claimed in claim 5, wherein the recesses each have a first stop portion and a second stop portion to restrict pivotal direction of the stand.

\* \* \* \* \*